United States Patent
Steensgaard

(10) Patent No.: US 7,039,908 B2
(45) Date of Patent: May 2, 2006

(54) UNIFICATION-BASED POINTS-TO-ANALYSIS USING MULTILEVEL TYPING

(75) Inventor: Bjarne Steensgaard, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 694 days.

(21) Appl. No.: 10/183,931

(22) Filed: Jun. 26, 2002

(65) Prior Publication Data

US 2004/0003382 A1 Jan. 1, 2004

(51) Int. Cl.
G06F 9/45 (2006.01)

(52) U.S. Cl. ............... 717/151; 717/140; 717/154; 711/142; 711/202

(58) Field of Classification Search ............ 717/151, 717/140, 141, 154, 144, 148, 114; 711/142, 711/202; 716/4
See application file for complete search history.

(56) References Cited

U.S. PATENT DOCUMENTS

| | | | |
|---|---|---|---|
| 5,493,675 A * | 2/1996 | Faiman et al. | 717/151 |
| 5,535,391 A * | 7/1996 | Hejlsberg et al. | 717/140 |
| 5,613,117 A * | 3/1997 | Davidson et al. | 717/144 |
| 5,836,014 A * | 11/1998 | Faiman, Jr. | 717/156 |
| 6,072,950 A | 6/2000 | Steensgaard | |
| 6,078,745 A * | 6/2000 | De Greef et al. | 717/151 |
| 6,202,202 B1 | 3/2001 | Steensgaard | |
| 6,442,663 B1 * | 8/2002 | Sun et al. | 711/202 |
| 6,691,301 B1 * | 2/2004 | Bowen | 717/114 |
| 6,799,315 B1 * | 9/2004 | Waki et al. | 717/148 |
| 6,856,950 B1 * | 2/2005 | Abts et al. | 703/13 |
| 6,904,577 B1 * | 6/2005 | Schubert et al. | 716/4 |
| 6,912,541 B1 * | 6/2005 | Sievert | 707/103 R |
| 6,934,942 B1 * | 8/2005 | Chilimbi | 717/158 |
| 2002/0010911 A1 | 1/2002 | Cheng et al. | |

OTHER PUBLICATIONS

TITLE: Characterizing the Memory Behavior of Compiler-Parallelized Applications, author: Torrie et al, IEEE, Aug. 1995.*
TITLE: Comparative Study of Page-based and Segment-based Software DSM through compiler optimization, author: Junpei Niwa et al, ACM, 2000.*
TITLE: On the importance of Points-To anlysis and other memory disambiguation methods for C programs, author: Ghiya et al, ACM, 2001.*

(Continued)

*Primary Examiner*—Chameli C. Das
(74) *Attorney, Agent, or Firm*—Merchant & Gould P.C.; Mark R. Hennings

(57) ABSTRACT

Location types in unification-based, flow-insensitive "points-to" analyses represent three kinds of sets of abstract memory locations in a three-level subtyping system. The data constructor for "middle" and "upper" kinds of location types has a reader and a writer component. The "middle" kind of location types represent singleton sets of abstract locations. The reader and writer components of the "middle" type are both the same location type. The "upper" kind of location types represent complex sets of abstract locations. The reader and writer components of the "upper" type may be dissimilar location types. The reader components represent the set of values that may be read from memory via a pointer represented by the location type containing the reader component. The writer components represent the set of values that may be written to memory via a pointer represented by the location type containing the writer component.

15 Claims, 8 Drawing Sheets

OTHER PUBLICATIONS

TITLE: Points-to Analysis for Java Using Annotated constraints, author: Rountev et al, ACM, 2001.*

"ACM SIGPLAN—Programming Language Design and Implementation," Association for Computing Machinery, Jun. 18-21,1995, 13 pages.

"1998 ACM SIGPLAN—Foundations of Software Engineering," Association for Computing Machinery, Nov. 3-5, 1998, 13 pages.

Dissertation Abstracts International—B "The Sciences and Engineering" vol. 60 No. 5, Nov. 1999, 5 pages.

"2000 ACM SIGPLAN—Programming Language Design and Implementation," Association for Computing Machinery, Jun. 18-21, 2000, 13 pages.

"2001 ACM SIGPLAN—SIGSOFT Workshop on Program Analysis for Software Tools and Engineering," Association for Computing Machinery, Jun. 18-19, 2001, 9 pages.

"Variable-precision Reaching Definitions Analysis" J. Softw: Maint: Res. Pract. 11, 117-142 (1999).

ACM SIGSOFT Symposium on the Fountains of Software Engineering; "Efficient Points-To Analysis For Whole-Program Analysis" Sep. 1999; 17 pages.

* cited by examiner

US 7,039,908 B2

UNIFICATION-BASED POINTS-TO-ANALYSIS USING MULTILEVEL TYPING

FIELD OF THE INVENTION

The present invention relates generally to the field of computer program analysis. More particularly, the present invention relates to the field of pointer analysis for computer programs.

BACKGROUND OF THE INVENTION

Software compilers compile input code in a source language into target code in a target language. The target code may be executed directly by a data processing system or linked by a suitable linker with other target code for execution by the data processing system.

To help improve the execution of target code by the data processing system, one typical compiler performs optimization techniques based on the expected run-time usage of memory locations for the compiled program as defined by a store model or storage shape graph. The compiler may generate the store model by performing a pointer analysis to determine the effects of program statements referencing memory locations with constants, variables, or functions, for example. One typical pointer analysis by type inference is insensitive to data-flow.

SUMMARY OF THE INVENTION

The present invention is directed to a method and apparatus that uses location types for performing unification-based, flow-insensitive "points-to" analyses. The location types represent sets of memory locations. The pointer analysis uses different kinds of location types, which are ordered by a subtyping hierarchy. A first location type is considered a subtype of a second location type if the set of memory locations represented by the first location type is a subset of the set of memory locations represented by the second location type.

Location types representing non-empty sets of memory locations have reader and writer type components. A reader type component of a location type represents the set of values that may be found in the memory locations represented by the location type. A writer type component of a location type represents the set of values that may be written to memory locations represented by the location type. For a location type representing a set of memory locations, the reader component may represent more values than does the writer component if values are only written into a subset of the represented memory locations.

The type components represent possible pointer values. A set of pointer values is represented by the location type representing the set of memory locations pointed to by the pointer values. The components of location types are therefore themselves location types. A location type may be depicted as a node in a store model or storage shape graph. The reader components of location types may be depicted as edges between nodes in the store model or storage shape graph.

According to one aspect of the invention, a computer-readable medium has a data structure that is used to define a type variable. The type variable comprises a first equivalence class representative (ECR) and a data type constructor for a location type. The type constructor may represent an empty set, a singleton set, or a complex set of locations. The type constructors representing non-empty sets of locations comprise a reader component that points to a second ECR and a writer component that points to a third ECR. A first type constructor may comprise as a supertype component another type constructor that represents a complex set of locations, which includes the set of locations represented by the first type constructor. The reader and writer components may each represent one of an empty set, a singleton set, and a complex set of locations. The reader component may be configured to point to the second ECR, which represents all the pointer values stored in the represented memory locations. The writer component of a location type representing a singleton set of locations is the same as the reader component. The writer component of a type constructor representing a complex set of locations may be configured to point to the third ECR, which represents the set of pointer values possibly stored into the represented locations by indirection through a pointer represented by the type constructor.

According to another aspect of the invention, a method for performing points-to analyses using location types from a type domain with at least three levels of subtyping in an optimizing compiler comprises subtyping constraints between the reader components and between the writer components of a first and second location type, if the first location type is a subtype of the second location type. If a first location type represents a first set of locations, and a second location type represents a complex second set of locations, including the first set of locations, the reader component of the first location type is the same as or a subtype of the reader component of the second location type, and the writer component of the second location type is the same as or a subtype of the writer component of the first location type. This corresponds to the fact that if a pointer value may be found in a first set of locations, then the pointer value may also be found in a complex second set of locations containing the first set of locations, and that a value may be stored into the first set of locations in an indirect assignment via a pointer to one of the locations in the complex second sets of locations containing the first set of locations.

According to another aspect of the invention, a hierarchy of location types may be expanded to reflect a recursive division of the set of all abstract memory location into smaller and smaller subsets. An abstract memory location may be represented by at most one location type from each level in the type hierarchy

DETAILED DESCRIPTION OF THE PREFERRED EMBODIMENT

Figure 1:
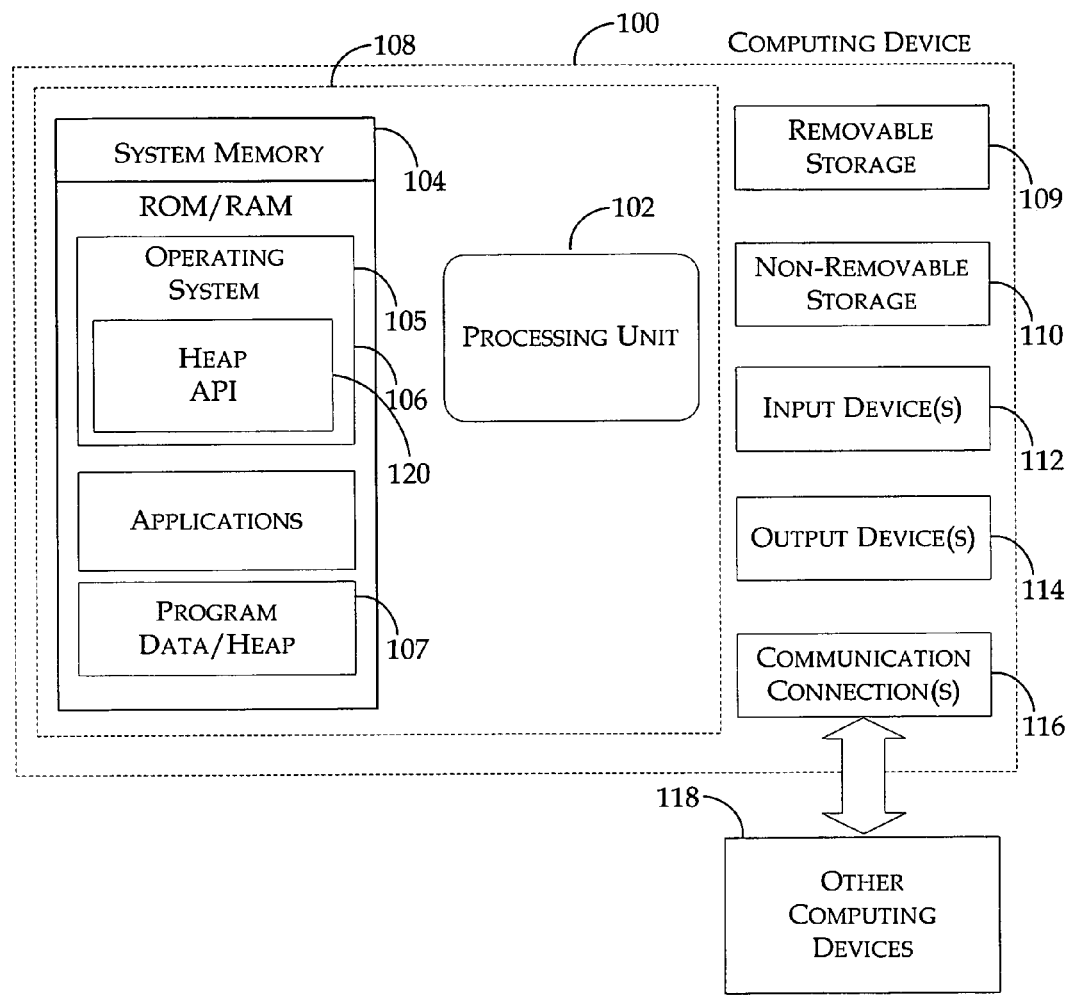
FIG. 1 is a functional block diagram of a computing device adapted to implement an embodiment of the invention.

FIG. 1 is a functional block diagram of a computing device adapted to implement an embodiment of the invention. With reference to FIG. 1, an exemplary system for implementing the invention includes a computing device, such as computing device 100. In a basic configuration, computing device 100 typically includes at least one processing unit 102 and system memory 104. Depending on the exact configuration and type of computing device, system memory 104 may be volatile (such as RAM), non-volatile (such as ROM, flash memory, etc.) or some combination of the two. System memory 104 typically includes an operating system 105, one or more program modules 106, and may include program data 107. This basic configuration is illustrated in FIG. 1 by those components within dashed line 108.

Computing device 100 may also have additional features or functionality. For example, computing device 100 may also include additional data storage devices (removable and/or non-removable) such as, for example, magnetic disks, optical disks, or tape. Such additional storage is illustrated in FIG. 1 by removable storage 109 and non-removable storage 110. Computer storage media may include volatile and nonvolatile, removable and non-removable media implemented in any method or technology for storage of information, such as computer-readable instructions, data structures, program modules or other data. System memory 104, removable storage 109 and non-removable storage 110 are all examples of computer storage media. Computer storage media includes RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 100. Any such computer storage media may be part of computing device 100. Computing device 100 may also have input device(s) 112 such as keyboard, mouse, pen, voice input device, touch input device, etc. Output device(s) 114 such as a display, speakers, printer, etc. may also be included. All these devices are known in the art and need not be discussed at length here.

Computing device 100 may also contain communications connection(s) 116 that allow the device to communicate with other computing devices 118, such as over a network. Communications connection(s) 116 is an example of communication media. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, communication media includes wired media such as a wired network or direct-wired connection, and wireless media such as acoustic, RF, infrared and other wireless media. The term computer-readable media as used herein includes both storage media and communication media.

The subject matter of this patent application is based, in part, upon subject matter disclosed in U.S. Pat. No. 6,072,950, which is incorporated herein by reference in its entirety.

Figure 2:
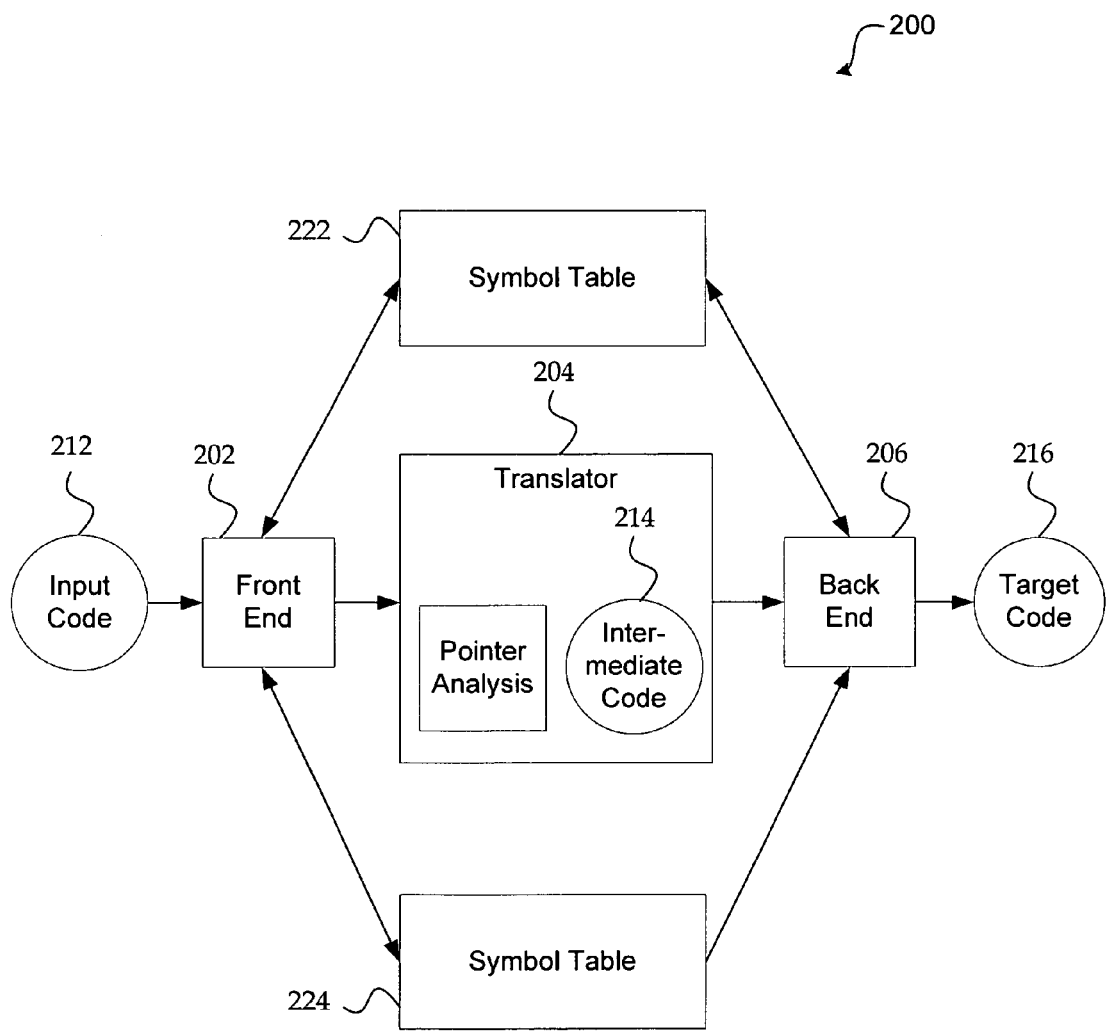
FIG. 2 is an overview schematic of a compiler system for efficiently performing "points-to" analysis in accordance with the present invention.

FIG. 2 is an overview schematic of a compiler system for efficiently performing "points-to" analysis in accordance with the present invention. Various techniques can be employed for enhancing computer programs, including instruction reordering and scheduling, customized heap and stack allocation, call graph building and function/method inlining, type check elimination, and synchronization elimination. The results of points-to analysis can be used by techniques used for enhancing computer programs. This pointer analysis may be used for any suitable programming tool or analyzer, such as a suitable program understanding and browsing tool or a suitable program compiler or interpreter for example. FIG. 2 illustrates for one embodiment a program compiler 200 that uses this pointer analysis.

Compiler system 200 is typically implemented in software for execution by a suitable data processing system. Compiler system 200 includes a front end 202, a translator 204, and a back end 206. Compiler system 200 compiles input code 212 in a suitable source language into target code 216 in a suitable target language. Target code 216 may be executed directly by a suitable data processing system or linked by a suitable linker with other target code for execution by the data processing system.

Front end 202 is typically language dependent and performs suitable lexical, syntax, and semantic analyses, for example, on input code 212. Translator 204 generates suitable intermediate code 214 based on the lexical, syntax, and semantic information generated by front end 202. Back end 206 generates target code 216 based on intermediate code 214. Back end 206 generates target code 216 for execution by particular machines (not shown). Compiler 200 generates intermediate code 214 to represent input code 212. Intermediate code 214 is typically independent of the source language for input code 212 and independent of the specific machine or data processing system to execute target code 216.

In analyzing input code 212, front end 202 generates a suitable symbol table 222. Symbol table 222 is in the form of a data structure for recording identifiers, such as variables and function names for example, that are used in input code 212. Suitable attribute information regarding each recorded identifier is also recorded and referenced for front end 202, translator 204, and back end 206.

Translator 204 performs the pointer analysis. Translator 204 evaluates statements referencing memory locations with variables and/or functions, for example, of input code 212 using symbol table 222 to determine store relationships among the memory locations. Translator 204 generates a store model 224 in the form of a data structure to represent an approximation of the run-time store usage for input code 212. For another embodiment, front end 202 may perform the pointer analysis to generate store model 224 while parsing input code 212. For another embodiment, back end 206 may perform the pointer analysis to generate store model 224 while generating the target code 216. Translator 204 and back end 206 may use store model 224 to help optimize intermediate code 214 and target code 216 with suitable techniques including, for example, code motion, common subexpression elimination, dead code elimination, peephole optimization, and register allocation techniques.

The pointer analysis uses location types to define a store model or storage shape graph representing an approximation of the run-time store usage for a program. A location type represents a set of one or more locations and describes the content of those locations. The location types define points-to relationships among the sets of locations as determined by the pointer analysis in accordance with typing constraints, and the set of location types for a program define the store model for the program. The location types used for the pointer analysis are to be distinguished from the program types, such as character, integer, long, float, double, etc., associated with type declarations in a program.

To define location types for a program in a source language supporting location pointer variables, such as for pointers to locations, dynamic data allocation, and/or data address computation for example, the pointer analysis in one embodiment represents each location for a variable of the program and each dynamically allocated location of the program with a location type. A location type represents a set of zero, one or more locations and comprises a type representing a set of locations that may be pointed-to by the content of the location(s). The pointer analysis describes each location pointer by the type representing the pointed-to location(s).

As values for variables may include pointers to locations, the pointer analysis for one embodiment describes the value of a variable with a location type to describe a location pointer. This typing may be described as follows:

$$\tau ::= \bot \mid \text{ref}(\tau,\tau) \mid \text{ref}^*(\tau,\tau)$$

That is, location type components $\tau$ represent locations and location pointers and are either $\bot$ or comprise a location type. The $\bot$ designation for the location type component $\tau$ indicates the described location-content does not comprise a potential location pointer. The $\text{ref}(\tau,\tau)$ designation indicates the contents of the described location represent a pointer to a single abstract location. The $\text{ref}^*(\tau,\tau)$ designation indicates the contents of the described location represent a pointer to a complex set of locations.

The pointer analysis may also describe composite objects, such as records or structures for example, and locations containing constants. The pointer analysis for one embodiment may represent the elements of a composite object with a single type and may represent locations containing constants with types similarly as locations containing non-pointer variables. The pointer analysis for another embodiment may represent the elements of composite objects with types representing the memory fragments corresponding to fields in the composite objects.

The pointer analysis for one embodiment represents each type with a type variable in the form of a data structure and associated type components in the form of data structures. Each type variable represents a set of one or more locations. For one embodiment, each type variable is implemented as an equivalence class representative (ECR) data structure with an associated type constructor data structure ("data constructor"). The ECR data structure may be implemented using Tarjan's fast-union/find data structure, for example.

The type components of a type variable that represents a set of locations comprises other type variables describing the content of the represented location(s). Using the above types, a ref location type comprises a location type component $\tau$. The location-type component $\tau$ is represented with a type variable.

The type components of a location type representing a non-empty set of locations represent the values that may be respectively written to and read from the represented memory locations. For a location type representing a single abstract memory location, the reader and writer type components represent the same set of values. For a location type representing multiple abstract locations, the reader type component represents the set of all values that could potentially be stored in any of the represented memory locations, and the writer type component represents the set of values that could potentially be stored in the represented memory locations via a pointer value represented by the location type.

If a first location type represents a first set of locations, and a second location type represents a complex second set of locations, including the first set of locations, the reader component of the first location type is the same as or a subtype of the reader component of the second location type, and the writer component of the second location type is the same as or a subtype of the writer component of the first location type. This corresponds to the fact that if a pointer value may be found in a first set of locations, then the pointer value may also be found in a complex second set of locations containing the first set of locations, and that a value may be stored into the first set of locations in an indirect assignment via a pointer to one of the locations in the complex second sets of locations containing the first set of locations.

Figure 3:
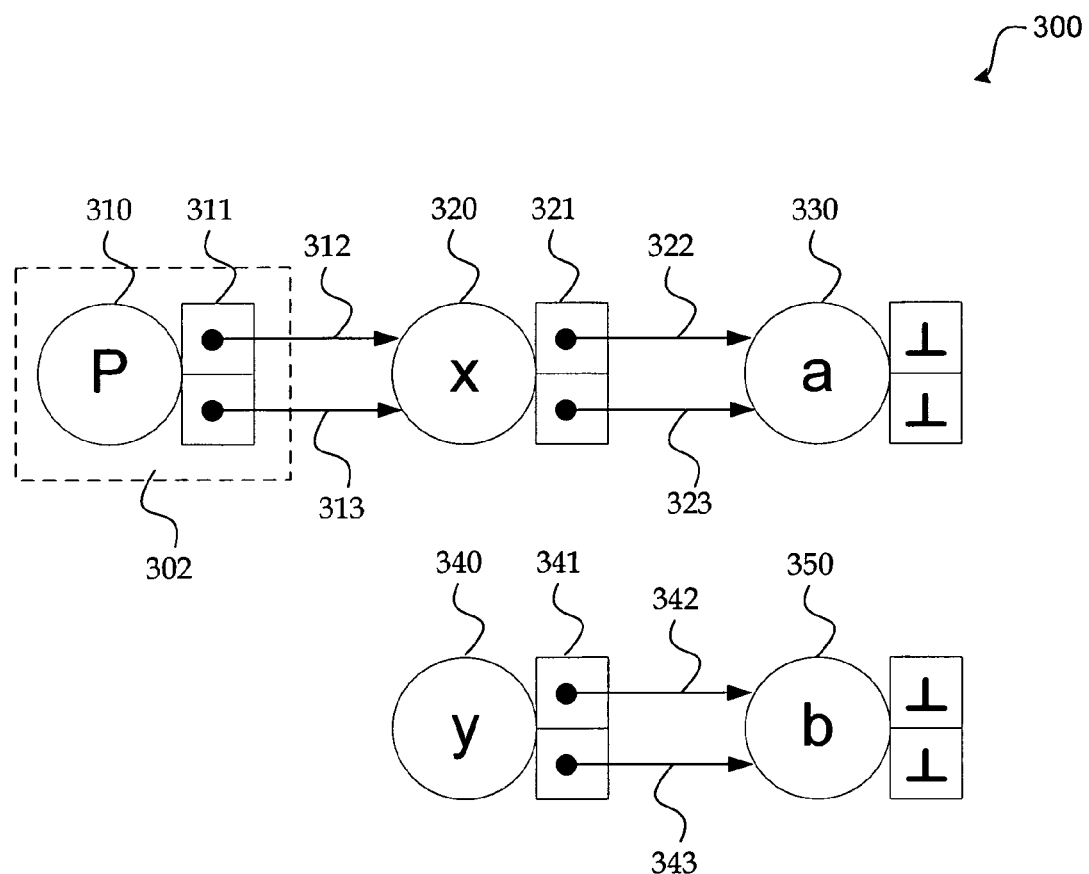
FIG. 3 is a graphical representation of a memory story model demonstrating type relationships of type variables in accordance with the present invention.

FIG. 3 is a graphical representation of a memory store model demonstrating type relationships of type variables in accordance with the present invention. Memory store model 300 comprises type variables (302, for example) that collectively form a memory store model. Each type variable is implemented as an equivalence class representative (310, for example) and an associated data constructor (311, for example) that describes the outgoing edge of the type variable. Each data constructor (311, for example) comprises a reader component (312, for example) and a writer component (313, for example). ECR 310 represents the pointer variable p. Data constructor 311 comprises a location type component $\tau$ represented by an ECR 320 with an associated data constructor 321. ECR 320 represents the variable x. Data constructor 321 comprises a location type component $\tau$ represented by ECR 330 with an associated data constructor 331. ECR 330 represents the variable a. Data constructor 331 comprises a "$\bot$" location type component, which indicates that the content of the location(s) representing the variable a does not comprise a location pointer (i.e., the type "$\bot$" represents the empty set of pointers).

ECR 340 is associated with ref data constructor 341 to form a type variable that represents the variable y. Data constructor 341 comprises a location type component $\tau$ represented by ECR 350. ECR 350 represents the variable b. Data constructor 351 comprises a "$\bot$" location type component, which indicates the variable b does not comprise a location pointer.

An algorithm that is suitable for generating type variables in response to input code is disclosed in U.S. Pat. No. 6,072,950, above which has been incorporated by reference. The first step for generating type variables in response to input code is to assign an ECR to each variable or object name, wherever they occur in the input code. The second step is generating type constraints according to the program statements for the program under analysis. The third step is solving the constraints. The second and third step may be performed simultaneously, as disclosed in U.S. Pat. No. 6,072,950. For example, input code suitable for generating the relationships outlined in FIG. 3 is as follows:

p=&x x=&a y=&b

Figure 4:
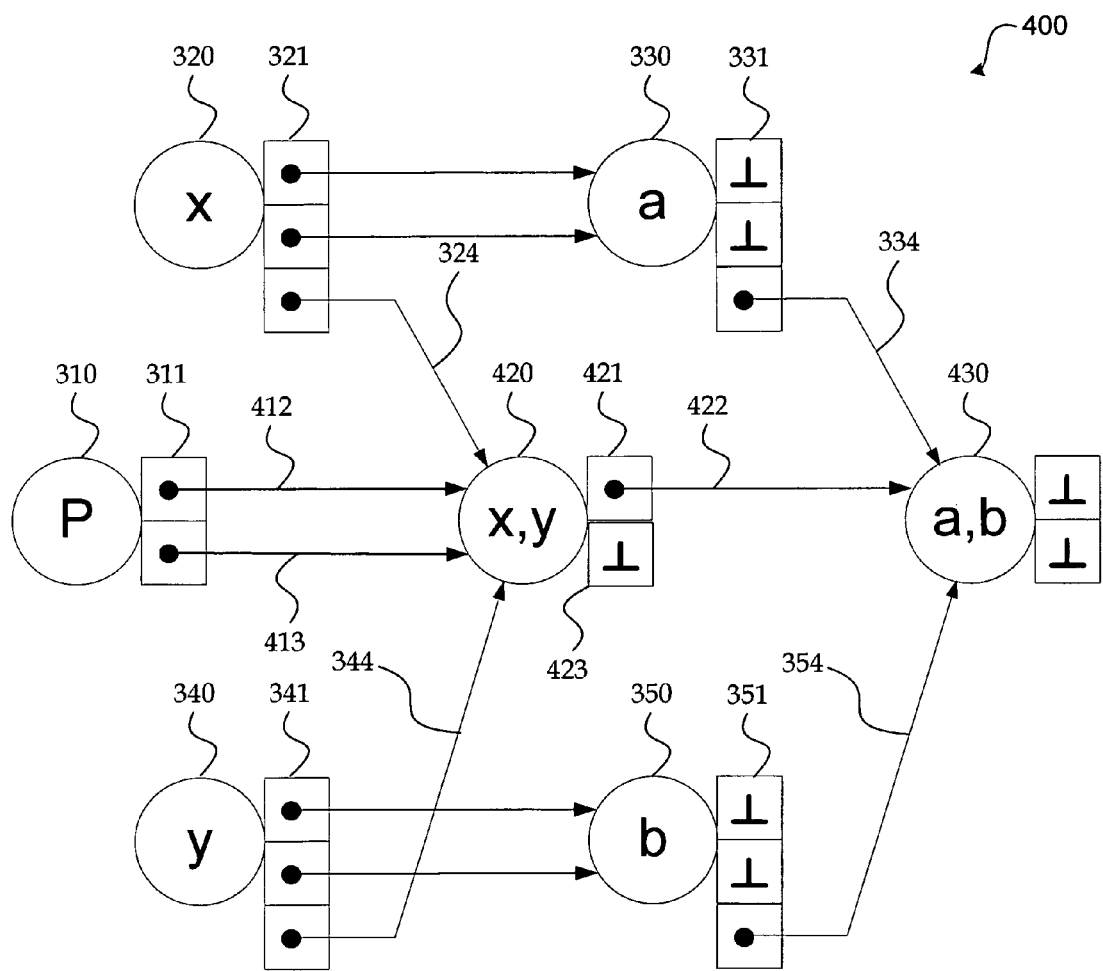
FIG. 4 is a graphical representation of type relationships demonstrating location types representing complex sets of memory locations in accordance with present invention.

FIG. 4 is a graphical representation of type relationships demonstrating location types representing complex sets of memory locations in accordance with present invention. If, in addition to the above code statements, pointer p is assigned the address of variable y, the equivalence class representation illustrated in FIG. 3 should change so that data constructor 311 has a type component that represents a set of memory locations including the memory location represented by ECR 340. The analysis algorithm described in U.S. Pat. No. 6,072,950 would unify the type variables represented by ECR 320 and ECR 340 and unify the type variables represented by ECR 330 and 350, making it impossible to make any distinction between uses of variable x and variable y, and making it impossible to make any distinction between uses of variable a and variable b.

In an embodiment of the present invention, a new equivalence class representative (ECR 420) is generated with an associated data constructor representing the location type of which the location types represented by data constructors 321 and 341 are subtypes. Data constructor 311 is updated, redirecting the reader and writer components from ECR 320 to ECR 420. Data constructor 321 further comprises a supertype component 324, which represents a complex set of locations (420), which includes the set of locations represented by the data constructor 321. Likewise, data constructor 341 further comprises a supertype component 344, which represents a complex set of locations (420), which includes the set of locations represented by the data constructor 341. The invention enables the analysis to make a distinction between variable x and variable y while allowing the analysis to consider variable x and variable y simultaneously using a single type variable.

ECR 430 with associated data constructor 431 is created to represent the location type of which the location types represented by data constructors 331 and 351 are subtypes. Likewise, data constructors 331 and 351 have been updated to include supertype components (334 and 354, respectively). To maintain the subtyping between type components of the location type representing both variable x and variable y and the type components of the location type representing variable x and the type components of the location type representing variable y, the reader component (422) of data constructor 421 should be ECR 430. This reflects that the value of the expression *p could be a pointer to either variable a or variable b. The writer component (423) of data constructor 421 is the "⊥" type, reflecting that no value has been written via *p.

For example, input code suitable for generating to relationships outlined in FIG. 4 is as follows:

p=&x x=&a y=&b p=&y

Pointer analysis describes the locations for a program with types so the set of types defining the store model for the program is a valid description of all possible run-time storage configurations for a program. For the program to be typed in this manner, or "well-typed," the pointer analysis identifies store relationships, including pointer relationships, among the locations for the program and describes the locations for the program with types in accordance with typing constraints based on the store relationships.

For a well-typed program, the pointer analysis represents each abstract location for the program with a type representing singleton sets of locations and describes each location pointer for the program with a type representing the pointed-to location(s). If a location pointer may point to either one of two locations, the pointer analysis also represents the two locations with the same type representing complex sets of locations and describes the location pointer with the type representing both locations. Each abstract location for the program may thus in one embodiment be represented by two location types, one location type representing only that abstract location, and another location type representing that abstract location in addition to other abstract locations.

The pointer analysis applies the typing constraints for a well-typed program based on store relationships among the locations for the program. For one embodiment, the pointer analysis identifies store relationships based on the form of each program statement referencing one or more locations. The pointer analysis describes locations affected by the store relationships with types in accordance with a type rule specifying the typing constraints for the statement form so the description of the store as defined by the store model is valid both before and after execution of the statement. If each program statement referencing one or more locations is typed in this manner, or well-typed, the program is well-typed. For one embodiment, the type rules for well-typed statements are as follows.

For a statement in the form q=p, both the value of the variable q and the value of the variable p will point to the same location after execution of the statement if the value of the variable y is a pointer. Before execution of the statement, the value of variable q may be a pointer that is never assigned to variable p. The set of possible pointer values of variable p is therefore a subset of the set of possible pointer values of variable q. If the variable p may contain pointer values, the location type describing the possible values of variable p should therefore either be the same as the location type describing the possible values of variable q, or the location type describing the possible values of variable p should be a subtype of the location type describing the possible values of variable q.

Using the above types, this type rule is described as:

$q=\text{ref}(\tau_1, \tau_1)$ $p=\text{ref}(\tau_2, \tau_2)$ $\tau_2 \leq \tau_1$ That is, a statement in the form q=p is well-typed if the type $\tau_2$ describing the value of the variable p and the type $\tau_1$ describing the value of the variable q satisfy the inequality constraint, $\tau_2 \leq \tau_1$, where $\text{ref}(\tau_1)$ represents the location representing the variable q and $\text{ref}(\tau_2)$ represents the location representing the variable p.

Using the above types, the inequality constraint $\tau_2 \leq \tau_1$ is satisfied (i.e., the set represented by $\tau_1$ is "bigger" than the set represented by $\tau_2$) when one of three logical conditions is satisfied. A first logical condition that may satisfy the inequality constraint is when the second location type does not represents a location. A second logical condition that may satisfy the inequality constraint is when the two location types are identical. A third logical condition that may satisfy the inequality constraint is when the second location type is a ref that represents a single location and the first location type is the ref* that represents the abstract location represented by the second location type in addition to other abstract locations.

For a statement in the form x=*y, the contents of the memory location pointed to by the pointer value stored in variable y gets assigned to the variable x. The set of possible pointer values stored in variable x should therefore include the possible pointer values stored in the set of locations possibly pointed to by pointer values stored in variable y. The location type describing the contents of the memory locations possibly pointed to by a pointer stored in variable y should therefore either be the same as the location type describing the possible values of variable p, or be a subtype of the location type describing the possible values of variable x.

Using the above types, this type rule is described as:

$x = \text{ref}(\tau_1, \tau_1)$ $y = \text{ref}(\tau_2, \tau_2)$ $(\tau_2 = \perp)$ or $(\tau_2 = \text{ref}(\tau_3, \tau_3)$ and $\tau_3 \leq \tau_1)$ or $(\tau_2 = \text{ref}^*(\tau_4, \tau_5)$ and $\tau_5 \leq \tau_1)$ That is, a statement of the form x=*y is well-typed if the reader component of the location type representing the contents of variable y is a subtype of the (writer) type component of the location type representing the variable x.

For a statement in the form *x=y, the contents of the variable y gets assigned into the memory location pointed to by the pointer value stored in variable x. The set of possible pointer values stored in the memory locations pointed to by the value of variable x should therefore include the possible pointer values stored in variable y. The location type describing the contents of variable y should therefore either be the same as the location type describing the possible values stored in the memory locations possibly pointed to by a pointer stored in variable p, or be a subtype of the location type describing the possible values stored in the memory locations possibly pointed to by a pointer stored in variable x.

Using the above types, this type rule is described as:

$x = \text{ref}(\tau_1, \tau_1)$ $y = \text{ref}(\tau 2, \tau 2)$ $(\tau_1 = \perp)$ or $(\tau_1 = \text{ref}(\tau_3, \tau_3)$ and $\tau_1 \leq \tau_3)$ or $(\tau_1 = \text{ref}^*(\tau_4, \tau_5)$ and $\tau_1 \leq \tau_4)$ That is, a statement of the form *x=y is well-typed if the (reader) type component of the location type representing the variable y is a subtype of the writer component of the location type representing the contents of variable x. A discussion of how the pointer analysis distinguishes between reads and writes via pointer indirection is discussed below with reference to FIG. 7.

Figure 5:
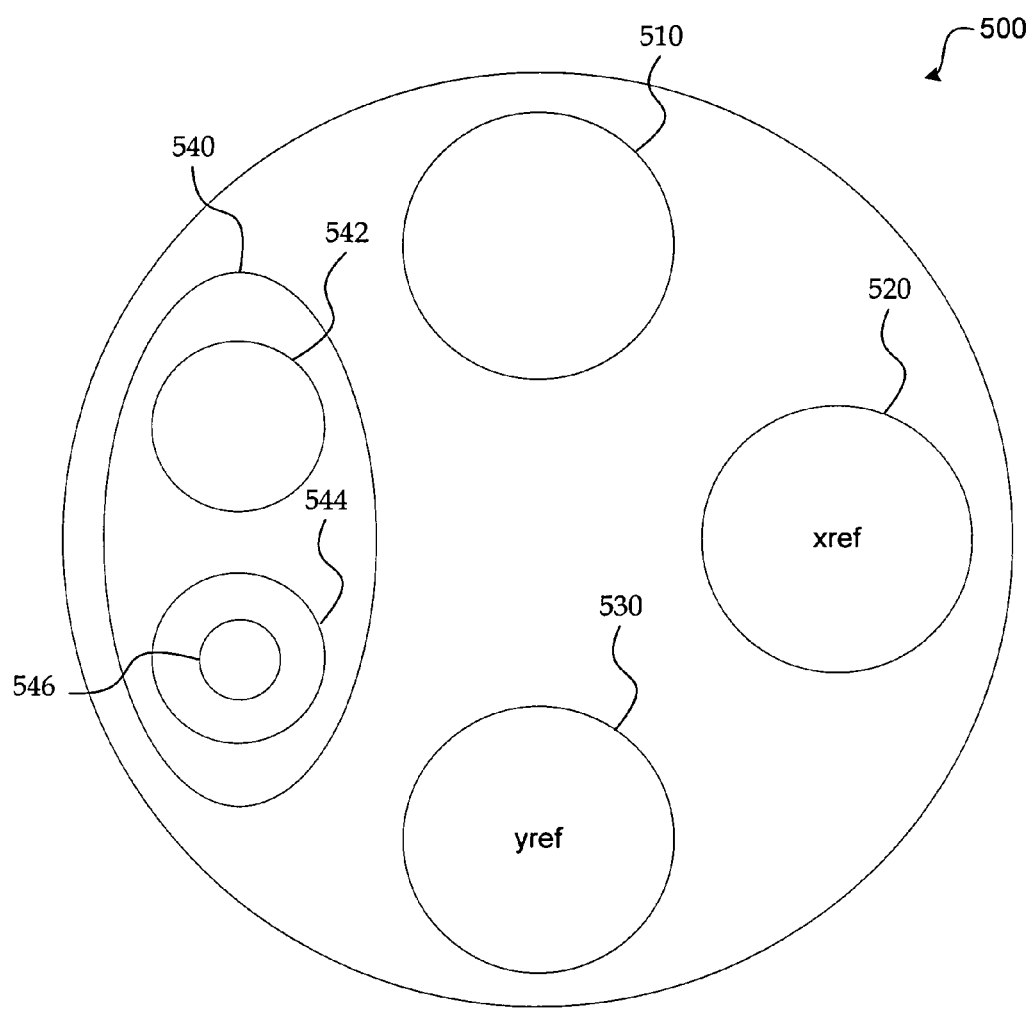
FIG. 5 is a graphical representation for illustrating recursive proper subsets in accordance with the present invention.

FIG. 5 may be viewed is a graphical representation of a set and how a first set may be a proper subset of second set, which in turn may be a proper subset of a third set, etc. Set 500 has sets 510, 520, 530, and 540 therein nested. Set 540 has even smaller sets 542 and 544 therein nested. Set 544 has a yet even smaller set 546 therein nested.

Similar to the recursive subsets illustrated in FIG. 5, the domain of location types may be refined from the preceding description to have more than two kinds of location types representing non-empty sets of memory locations. A first location type would be a subtype of a second location type if the set of memory locations represented by the first location type is a proper subset of the set of memory locations represented by the second location type. Such a refined domain of location types is particularly suited for analysis in accordance with the present invention of programs written in programming languages having hierarchical classes. Nesting kinds of location types is suitable for object-oriented or hierarchical languages such as C# and The Java Programming Language because the unbounded number of levels that can be nested may be used to model class hierarchies.

Figure 6:
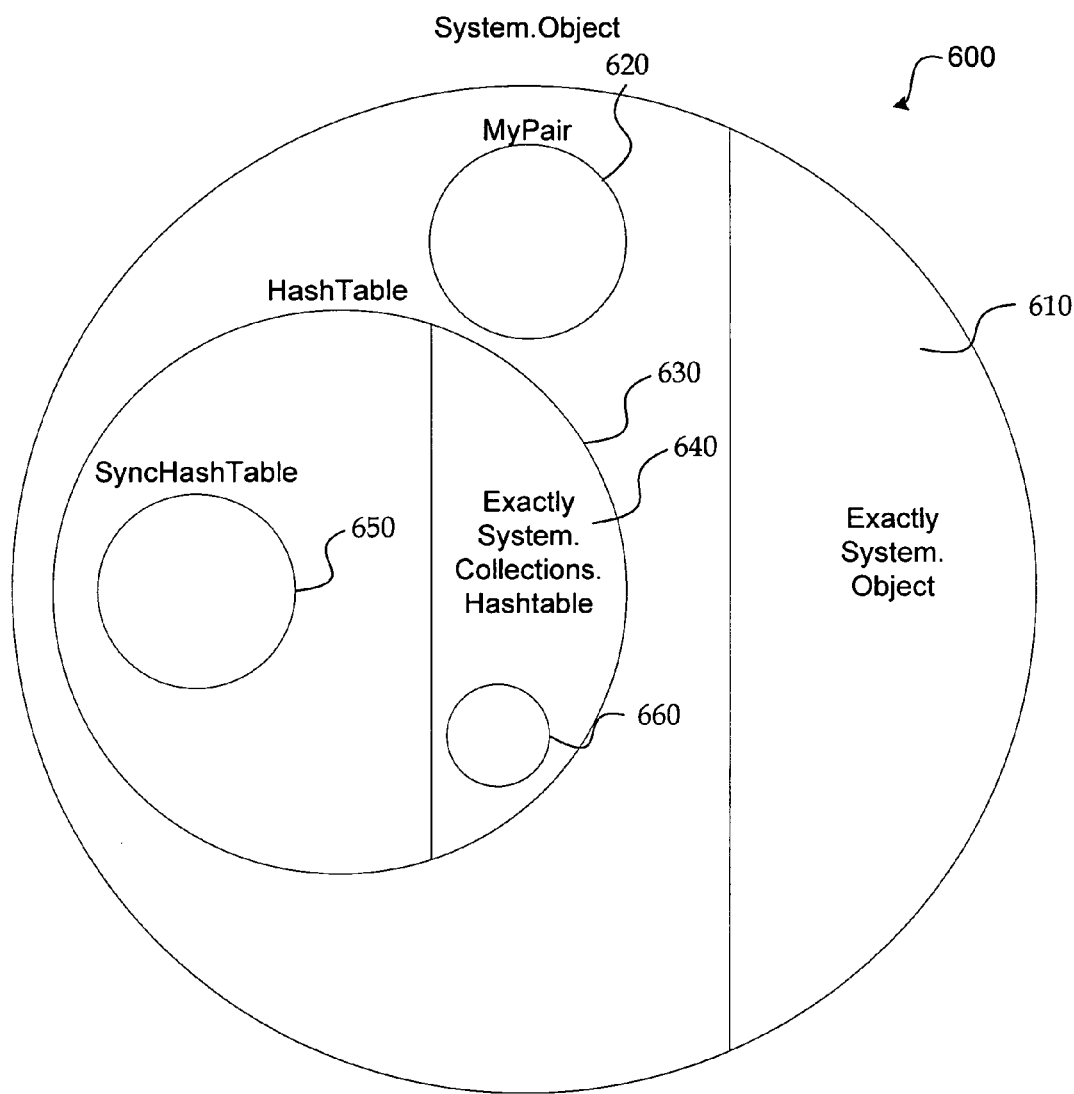
FIG. 6 is a graphical representation for illustrating how the type system of a hierarchical language can be used to describe a hierarchy of sets of program objects ordered by subset relations in accordance with the present invention.

FIG. 6 is a graphical representation of how the type system of a programming language such as C# can be used to describe a hierarchy of sets of program objects ordered by the subset relation. Set 600 represents the objects whose program type is System.Object or a subtype of System.Object (this describes all C# objects). Set 610 represents the objects whose program type is the exact type System.Object. Set 620 represents the objects whose program type is the type MyPair or a subtype of MyPair. Set 630 represents the objects whose program type is System.Collections.Hashtable or a subtype of System.Collections.Hashtable. Set 640 represents the objects whose type is the exact type System.Collections.Hashtable. C# program type System.Collections.Hashtable inherits from program type System.Object. Set 650 represents the objects whose program type is the type System.Collections.SyncHashtable or a subtype of System.Collections.SyncHashtable. C# program type System.Collections.SyncHashtable inherits from program type System.Collections.Hashtable. Set 660 is a singleton set representing a specific object of type System.Collections.Hashtable.

In accordance with the present invention, a hierarchy of kinds of location types can mirror the hierarchy of sets of objects imposed by the program type hierarchy. A single abstract location, as described by set 660 may be represented by a location type $\text{ref}(\tau)$. A complex subset of the abstract locations described by set 640 may be represented by a location type $\text{ref}^*_{Hashtable}(\tau)$. A subset of the abstract locations described by set 630 may be represented by a location type $\text{ref}^{}_{Hashtable}(\tau)$. A set of abstract locations containing an element described by set 620 and an element described by set 650 may be represented by a location type $\text{ref}^{}_{Object}(\tau)$. When the type hierarchy is designed in such a fashion that an abstract memory location is represented by at most one location type of each kind in the type hierarchy, the type system is suitable for efficient program analysis using type unification in accordance with the present invention.

In accordance with the present invention, a hierarchy of kinds of location types can be dictated by the typographical appearance of variables and memory allocation statements in the input program. In one embodiment, the hierarchy may reflect an encoding of the line number of the variable declaration or the memory allocation statement. In another embodiment, the hierarchy may reflect in which function, procedure, or method the variable declaration or the memory allocation statement occurs. In another embodiment, the hierarchy may reflect in which source file the variable declaration or the memory allocation statement occurs. In another embodiment, the hierarchy may reflect a combination of the above typographical criteria for classifying abstract memory locations.

The pointer analysis distinguishes between reads and writes via pointer indirection. The reader and writer location type components are provided for this purpose. For example, referring again to FIG. 4, given a statement such as *p=&z, either of variable x and variable y may be modified to contain a pointer to variable z. To reflect this, both data constructor 321 (x) and data constructor 341 (y) would have to have a writer (and reader) component representing variable z (not shown in FIG. 4). To reflect the assignment *p=&z, where the value of *p is represented by ECR 420, data constructor 421 should have a writer type component representing the memory location of variable z. As a value written to an element of a first set of locations could be written to an element of any subset of the first set, so subtype constraints are maintained between the writer components of location types ordered by a subtype relation. The subtype constraints between the writer components dictate that data constructor 321 and data constructor 341 have a writer component that represents the memory location of variable z.

Figure 7:
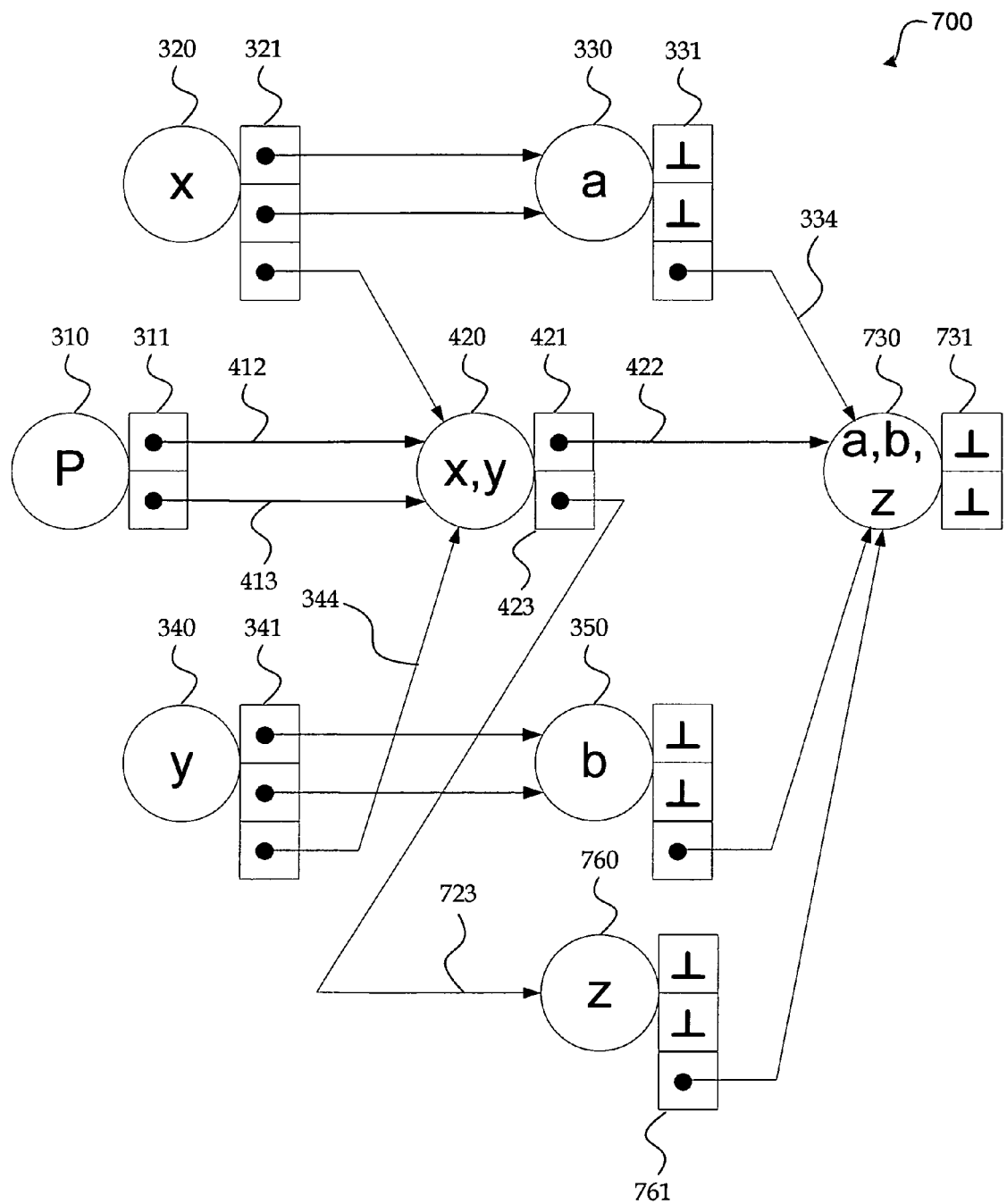
FIG. 7 is a graphical illustration for demonstrating the effects of constraints between writer components of location types ordered by subtyping in accordance with the present invention.

FIG. 7 is a graphical representation that demonstrates the effects of the constraints between writer components of location types ordered by subtyping. ECR 760 and associated data constructor 761 represent the memory location of variable z. The writer component of data constructor 421 has been modified to be ECR 760. The subtype constraint between the writer component (723) of data constructor 421 and data constructor 321 dictates that the writer component of data constructor 321 also represents the memory location of variable z. The writer component of data constructor 321 was ECR 330, which only represents the memory location of variable a. The new writer component should therefore represent the memory location of variable z in addition to the memory location of variable a. Only a ref*(τ) location type may represent more than one abstract location, and each memory location may only be represented by one ref*(τ) location type. Since the location type representing the memory location of variable z was not a subtype of a ref*(τ) location type, the supertype component of data constructor 761 becomes ECR 430. If data constructor 761 already had a supertype component, the supertype component of data constructor 331 should be unified with the supertype component of data constructor 761.

Figure 8:
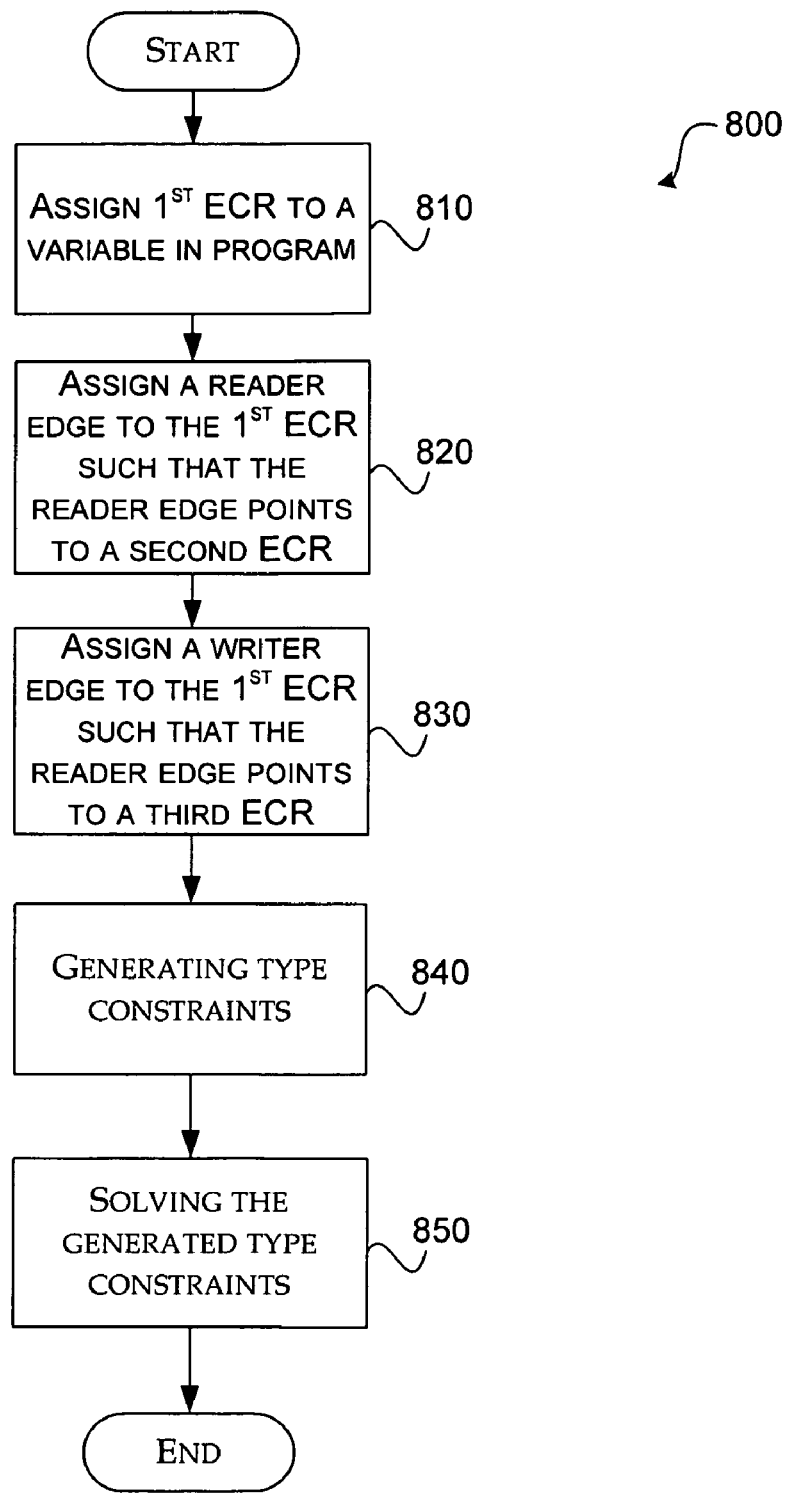
FIG. 8 is a flow diagram generally illustrating a process for performing a points-to analysis in an optimizing compiler in accordance with the present invention.

FIG. 8 is a flow diagram generally illustrating a process for performing a points-to analysis in an optimizing compiler in accordance with the present invention. In step 810, a first equivalence class representative is assigned to a variable in a computer program. In step 820, a reader edge pointer is assigned to a data constructor associated with the first ECR such that the reader edge points to a second ECR. In step 830, a writer edge is assigned to the data constructor associated with the first ECR such that the reader edge points to a third ECR. Independently assignable reader and writer edges permits enforcement of the inequality constraint discussed with reference to FIG. 4. In step 840, type constraints are generated according to the program statements for the program under analysis. In step 850, the constraints are solved as illustrated above with reference to FIGS. 4 and 7.

The above specification, examples and data provide a complete description of the manufacture and use of the composition of the invention. Since many embodiments of the invention can be made without departing from the spirit and scope of the invention, the invention resides in the claims hereinafter appended.

I claim:

1. A computer-implemented method for points-to analysis using at least three levels of subtyping in an optimizing compiler, comprising:

assigning a first location type to one of a variable and an expression in a computer program, wherein the assigning of the first location type includes assigning a first location type that has exactly one location type supertype representing the abstract locations represented by the first location type, and wherein the location type supertype represents other memory locations that are not represented by the first location type;

assigning a supertype component to a data constructor associated with the first location type, wherein the supertype component has the location type representing the set of abstract location represented by the first location type, and wherein the location type supertype represents other memory location that are not represented by the first location type;

assigning a reader component to a data constructor associated with the first location type, whereby the reader component has a second location type; and assigning a writer component to a data constructor associated with the first location type, whereby the writer component has a third location type.

2. The method of claim 1, wherein the assigning of the first location type includes assigning a first location type that represents a complex set of abstract locations.

3. The method of claim 2, wherein the assigning of the first location type includes assigning a first location type that is a subtype of a second location type that is arranged to represent a complex set of abstract locations that includes the set of abstract locations that are represented by the first location type.

4. The method of claim 3, wherein the assigning of the first location type includes assigning the first location type to a first set of memory locations that has a subset relationship to a second set of memory locations having the second location type such that the subset relationship of the first and second sets reflects a subtype relationship between program types.

5. The method of claim 3, wherein the assigning of the first location type includes assigning a first location type wherein the subset relationship between the sets of memory locations that are represented by the first and second location types is arranged to reflect the program typographical appearance of the abstract locations.

6. The method of claim 1, wherein the assigning of the reader component includes assigning a reader component that has a location type that represents one of an empty set, a singleton set that represents a single abstract location, and a complex set that represents multiple abstract locations.

7. The method of claim 6, wherein the assigning of the writer component includes assigning a writer component that has a location type that represents one of an empty set, a singleton set that represents a single abstract location, and a complex set that represents multiple abstract locations.

8. An apparatus for performing points-to analysis, comprising:

means for assigning a first location type to one of a variable and an expression in a computer program, wherein the first location type is arranged to represent exactly one abstract location in a computer program and wherein the first location type has exactly one location type supertype representing the set of abstract location represented by the first location type, and wherein the location type;

means for assigning a reader component to a data constructor associated with the first location type, whereby the reader component has a second location type; and means for assigning a writer component to the data constructor associated with the first location type, whereby the writer component has a third location type, wherein the first location type has exactly one location type supertype representing the set of abstract location represented by the first location type, and wherein the location type supertype is arranged to represent other memory locations that are not represented by the first location type.

9. The apparatus of claim 8, further comprising means for assigning a supertype component to a data constructor associated with the first location type, wherein the supertype component has the location type representing the set of abstract location represented by the first location type, and wherein the location type supertype is arranged to represent other memory locations that are not represented by the first location type.

10. The apparatus of claim 9, wherein the assigning of the first location type is arranged to represent a complex set of abstract locations.

11. The apparatus of claim 10, wherein the first location type is a subtype of a fourth location type that is arranged to represent a complex set of abstract locations that includes the set of abstract locations that are represented by the first location type.

12. The method of claim 11, wherein the first location type is arranged to represent a first set of memory locations that has a subset relationship to a second set of memory locations having the fourth location type such that the subset relationship of the first and fourth sets reflects a subtype relationship between program types.

13. The method of claim 11, wherein the first location type is arranged to represent a subset relationship between the sets of memory locations that are represented by the first and fourth location types such that the subset relationship reflects the program typographical appearance of the abstract locations.

14. The apparatus of claim 9, wherein the reader component has a location type that is arranged to represent one of an empty set, a singleton set that represents one abstract location, and a complex set that represents multiple abstract locations.

15. The apparatus of claim 14, wherein the writer component has a location type that is arranged to represent one of an empty set, a singleton set that represents one abstract location, and a complex set that represents multiple abstract locations.

* * * * *

UNITED STATES PATENT AND TRADEMARK OFFICE
CERTIFICATE OF CORRECTION

PATENT NO. : 7,039,908 B2  Page 1 of 1
APPLICATION NO. : 10/183931
DATED : May 2, 2006
INVENTOR(S) : Bjarne Steensgaard It is certified that error appears in the above-identified patent and that said Letters Patent is hereby corrected as shown below:

Title page, Item (56), under "Other Publications", delete "anlysis" and insert -- analysis --, therefor.

On page 2, Item (56), under "Other Publications", delete "ACM" and insert -- 1995 ACM --, therefor.

On page 2, Item (56), under "Other Publications", in column 2, line 8, delete "(1999)." and insert -- (1999), 25 pages. --, therefor.

On Sheet 1 of 8, in Fig. 1, below "Fig. 1" insert -- PRIOR ART --.

In column 2, line 46, after "hierarchy" insert -- . --.

Signed and Sealed this

Thirtieth Day of March, 2010

David J. Kappos
*Director of the United States Patent and Trademark Office*